United States Patent
Shibata (10) Patent No.: US 7,426,591 B2
(45) Date of Patent: Sep. 16, 2008

(54) INFORMATION COMMUNICATION DEVICE AND CONDITION SETTING METHOD

(75) Inventor: Tetsuya Shibata, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 420 days.

(21) Appl. No.: 10/571,408

(22) PCT Filed: Sep. 8, 2004

(86) PCT No.: PCT/JP2004/013055

§ 371 (c)(1),
(2), (4) Date: Mar. 9, 2006

(87) PCT Pub. No.: WO2005/026969

PCT Pub. Date: Mar. 24, 2005

(65) Prior Publication Data

US 2006/0184703 A1    Aug. 17, 2006

(30) Foreign Application Priority Data

Sep. 11, 2003    (JP) .............................. 2003-320417

(51) Int. Cl.
G06F 13/00    (2006.01)

(52) U.S. Cl. .......................................... 710/104; 707/1

(58) Field of Classification Search ................. 710/104; 707/1
See application file for complete search history.

(56) References Cited

U.S. PATENT DOCUMENTS 5,625,810 A * 4/1997 Kurosu et al. .................. 707/1

FOREIGN PATENT DOCUMENTS

| JP | 05-087378 | 4/1993 |
|----|-----------|--------|
| JP | 07-115425 | 5/1995 |
| JP | 08-161247 | 6/1996 |
| JP | 11-163810 | 6/1999 |
| JP | 2000-286889 | 10/2000 |
| JP | 2002-135250 | 5/2002 |
| JP | 2002-152155 | 5/2002 |
| JP | 2003-143176 | 5/2003 |

* cited by examiner

Primary Examiner—Clifford H Knoll
(74) Attorney, Agent, or Firm—George W. Neuner; David G. Conlin; Edwards Angell Palmer & Dodge LLP (57) ABSTRACT

A multifunctional device extracts identification information items from received device-cloning file data items and determines whether a data restoration process is a backup process or a cloning process based on whether or not a serial number in the identification information items is identical with a serial number in a multifunctional device having received the device-cloning file data items. In the backup process, specific information items and general information items are restored. In the cloning process, only general information items are restored.

6 Claims, 10 Drawing Sheets

| IDENTIFICATION INFORMATION ITEMS | SERIAL NUMBER | K1234-5567 |
|---|---|---|
| | IDENTIFICATION ID | A0012 |
| | IP ADDRESS | 192.100.100.88 |
| SPECIFIC INFORMATION ITEMS | TOTAL COUNTER | 57452 |
| | MAINTENANCE HISTORY | 2003/7/7 |
| | TROUBLE HISTORY | E7 U2 F6 E4 |
| | PRODUCT KEY | PK98367522 |
| | PLACE OF DESTINATION | JAPAN |
| GENERAL INFORMATION ITEMS | SHEET-FEEDING TRAY SETTING | TRAY 1:A4  TRAY 2:B4  TRAY 3:A3 |
| | SHUT-OFF TIME | 10 MINUTES |
| | TONER SAVE | ON |
| | AUTOMATIC RECEPTION | ON |
| | DIAL SETTING | PB |
| | HANDSET | ON |
| | TELEPHONE/FAX SWITCHING | ON |
| | NUMBER OF CALLING | 3 TIMES |

．
．
．

| GENERAL INFORMATION ITEMS | RESULT TABLE PRINTING | ONLY IN ERROR |
|---|---|---|
| | SOURCE INFORMATION | SHARP DOCUMENT HEADQUARTERS |
| | ADDRESS BOOK 1 | SHARP PLANNING DEPARTMENT 06-111-2345 |
| | ADDRESS BOOK 1 | SUZUKI ELECTRICS INC. 03-333-6789 |
| | ADDRESS BOOK 1 | TAIYO INDUSTRY INC.  03-555-3478 |

DATA STRUCTURE INFORMATION ITEMS OF DEVICE A

| SOFT Ver | 2.1 |
|---|---|
| DATA STRUCTURE Ver | 1.5 |
| SIZE OF DATA | 1024 BYTE |
| NUMBER OF DATA | 50 |
| DATA ID | D1,D2,D3,D4,D5 ··· D50 |
| PLACE OF DESTINATION | JAPAN |

FIG. 5 (b)

DATA STRUCTURE INFORMATION ITEMS OF DEVICE B

| SOFT Ver | 3.0 |
|---|---|
| DATA STRUCTURE Ver | 2.2 |
| SIZE OF DATA | 1064 BYTE |
| NUMBER OF DATA | 52 |
| DATA ID | D1,D2,D3,D4,D5 ··· D52 |
| PLACE OF DESTINATION | JAPAN |

FIG. 6

DEVICE-CLONING DATA OF DEVICE A

| DATA ID | VALUE | CLASSIFICATION | EXPLANATION (NOT EXIST IN REAL TABLE) |
|---|---|---|---|
| D1 | 1234 | IDENTIFICATION INFORMATION ITEMS | SERIAL NUMBER |
| D2 | 9999 | SPECIFIC INFORMATION ITEMS | NUMBER OF COPY |
| D3 | ON | GENERAL INFORMATION ITEMS | TWO-SIDED PRINTING |
| D4 | 60 | GENERAL INFORMATION ITEMS | AUTO SHUT-OFF TIME |
| D5 | A4 | GENERAL INFORMATION ITEMS | TRAY SETTING   TRAY 1 |

· · ·

| D50 | OFF | GENERAL INFORMATION ITEMS | COMMUNICATION RECORDING TABLE AUTOMATIC PRINTING |

DEVICE-CLONING DATA BACKED UP IN DEVICE A IS RESTORED IN DEVICE B

DEVICE-CLONING DATA OF DEVICE B

| DATA ID | VALUE | CLASSIFICATION | EXPLANATION (NOT EXIST IN REAL TABLE) |
|---|---|---|---|
| D1 | 6789 | IDENTIFICATION INFORMATION ITEMS | SERIAL NUMBER |
| D2 | 3333 | SPECIFIC INFORMATION ITEMS | NUMBER OF COPY |
| D3 | ON | GENERAL INFORMATION ITEMS | TWO-SIDED PRINTING |
| D4 | 60 | GENERAL INFORMATION ITEMS | AUTO SHUT-OFF TIME |
| D5 | A4 | GENERAL INFORMATION ITEMS | TRAY SETTING   TRAY 1 |

· · ·

| D50 | OFF | GENERAL INFORMATION ITEMS | COMMUNICATION RECORDING TABLE AUTOMATIC PRINTING |
| D51 | ON | GENERAL INFORMATION ITEMS | HANDSET |
| D52 | USA | GENERAL INFORMATION ITEMS | DISPLAY LANGUAGE SETTING |

DEVICE B HAS TWO MORE IDS THAN DEVICE A BECAUSE D51 AND D52 HAVE NO INFORMATION ITEMS, THEY ARE SET TO DEFAULT VALUES

INFORMATION COMMUNICATION DEVICE AND CONDITION SETTING METHOD

TECHNICAL FIELD

The present invention relates to an information communication device which is connected with an information system such as an OA system via a network and which functions as a part of the information system.

BACKGROUND ART

An example of an information communication device connected with an information system via a network is a digital multifunctional device or the like. Such digital multifunctional device needs various condition settings. However, in a case where a plurality of multifunctional devices are connected with the information system, it is very troublesome for a user to perform condition settings with respect to each of the multifunctional devices.

In order to solve this problem, Japanese Unexamined Patent Publication No. 135250/2002 (Tokukai 2002-135250; published on May 10, 2002) discloses an arrangement in which common setting data is serially delivered to and set in a plurality of network devices. Namely, in this arrangement, when setting is performed in one of the network devices connected with a network, conditions having been set are read out and stored, and the stored conditions are delivered to other one or more network devices, thereby performing the same setting in other one or more network devices as the network device having been first set.

In the arrangement disclosed in Japanese Unexamined Patent Publication No. 135250/2002, only parameters commonly used among the network devices are set because it is an object to read out setting conditions of a single network device and to import the setting conditions into other devices. However, reading out setting conditions of a single network device and setting the read out conditions in other one or more network devices also may be carried out to back up the setting conditions of the single network device itself. In a case where the setting is performed so as to back up the conditions of the single network device as described above, it is necessary to return not only common parameters but also data specific to the device or information specific to the device.

In this way, a case where setting conditions of a single device is read out and imported into other one or more devices is different from a case where setting conditions of a single device is read out and returned to the device itself in terms of a range of setting. Therefore, a user has to perform the setting in consideration of the difference, which is troublesome.

DISCLOSURE OF INVENTION

The present invention was made in view of the forgoing problems, and its object is to provide an information processing device capable of setting parameters of the device with high operativity by performing setting of the device according to identification information items of the device.

In order to achieve the object, an information communication device according to the present invention is a device connectable with an information system via a network, the information communication device including: a storage section for storing (i) identification information items which include a device identifier by which the information communication device is identified, (ii) specific information items specific to the information communication device, and (iii) general information items whose settings are capable of being imported to other one or more devices; a communication section for receiving identification information items, specific information items, and general information items through communication with an outside; a determination section for determining whether or not a device identifier included in the received identification information items is identical with the device identifier stored in the storage section; and an information registration section for (i) resetting the specific information items and the general information items stored in the storage section so that the specific information items and the general information items are respectively identical with the received specific information items and the received general information items when the determination section determines that the device identifiers are identical with each other and (ii) resetting only the general information items stored in the storage section so that the general information items are identical with the received general information items when the determination section determines that the device identifiers are not identical with each other.

With the arrangement, when the device identifiers are identical with each other, it is determined that backup data items are returned (a backup process is performed) to a single device, with a result that both of the specific information items and the general information items are registered. Further, when both of the device identifiers are not identical with each other, it is determined that setting conditions are imported from the single device to another device of the same kind (a cloning process is performed), with a result that only the general information items shared in common by the two devices are registered. As a result, it is possible for the user to set parameters in the device with high operativity without determining, in setting data items to be imported, whether the backup process or the cloning process is performed.

Additional objects, features, and strengths of the present invention will be made clear by the description below. Further, the advantages of the present invention will be evident from the following explanation in reference to the drawings.

BRIEF DESCRIPTION OF DRAWINGS

FIG. 5($a$) illustrates an example of data structure information items of a device from which data is to be imported in a cloning process.

FIG. 5($b$) illustrates an example of data structure information items of a device to which data is to be imported.

BEST MODE FOR CARRYING OUT THE INVENTION

Figure 2:
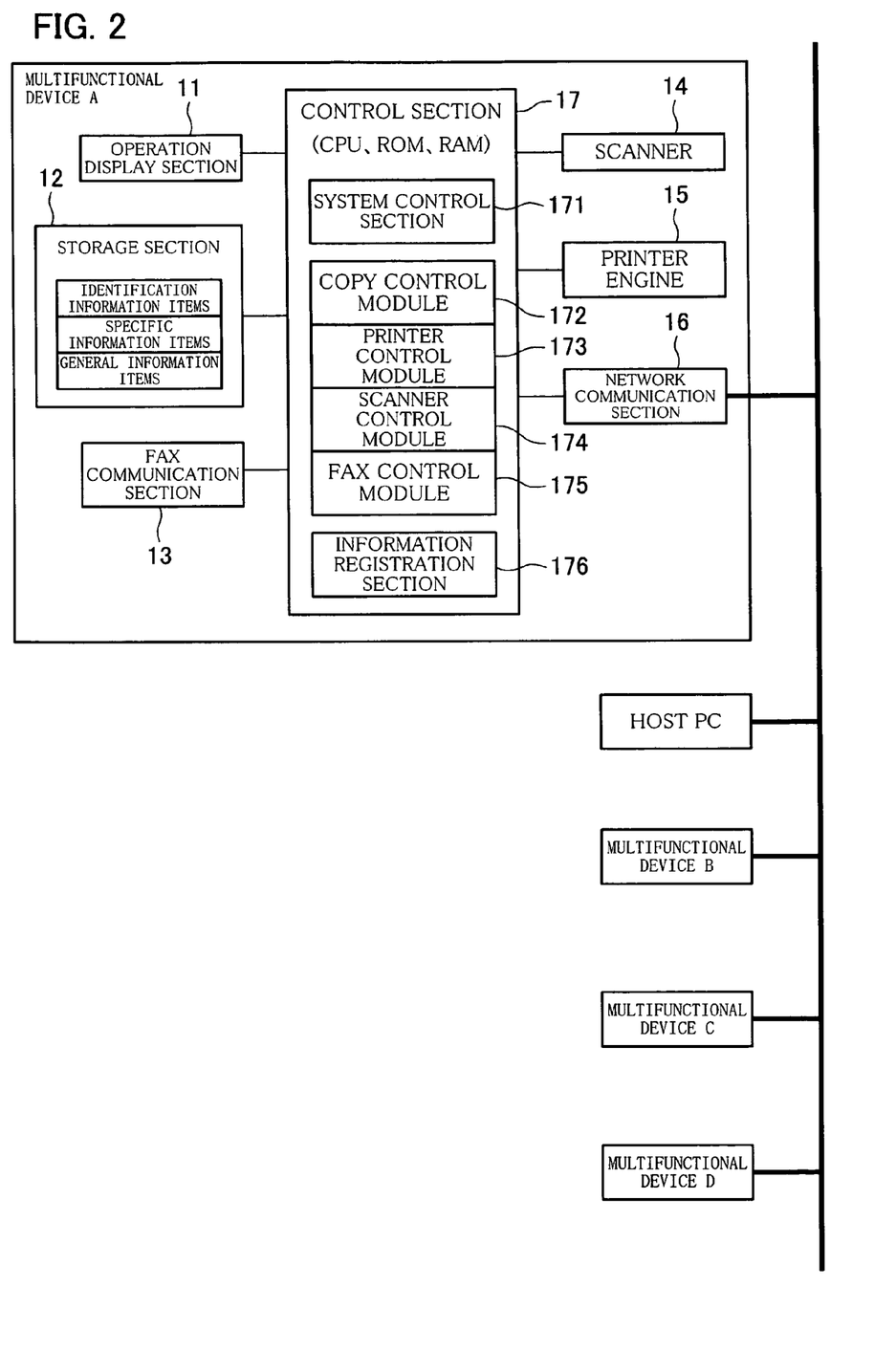
FIG. 2 is a block diagram schematically illustrating structures of an information system and a digital multifunctional device to which the present invention is applicable.

With reference to drawings, the following explains an embodiment of the present invention. First, FIG. 2 illustrates an example of an information system according to the present invention. The information system illustrated in FIG. 2 is constituted of multifunctional devices A through D and a host PC (Personal Computer). An information communication device according to the present invention is applied to the multifunctional devices A through D.

The multifunctional device A is connectable with the information system via a network and includes a copying function, a printing function, a scanner function, a facsimile function and the like. Further, the multifunctional devices B through D are substantially the same as the multifunctional device A except for detailed specs. Therefore, the following explanation uses the multifunctional device A as an example.

The multifunctional device A illustrated in FIG. 2 includes an operation display section 11, a storage section 12, a FAX communication section 13, a scanner 14, a printer engine 15, a network communication section 16, and a control section 17.

The operation display section 11 serves as input means by which a user operates the multifunctional device A and as display means by which operation of the multifunctional device A is displayed. The storage section 12 is means for storing identification information items, specific information items, and general information items. The FAX communication section 13 is means for performing FAX communication via a telephone line or the like. The scanner 14 is means for reading out an image of a document and obtaining data of the image at a time when the multifunctional device A operates in a copy mode or a FAX mode. The printer engine 15 is means for printing the data of the image when the multifunctional device A operates in the copy mode or the FAX mode. The network communication section 16 is means for communicating setting conditions and the data of the image between the multifunctional device A and other one or more devices (the host PC and the multifunctional devices B through D) connected with the multifunctional device A via the network.

Further, a control section 17 is means for controlling operation of the multifunctional device A and includes a system control section 171, a copy control module 172, a printer control module 173, a scanner control module 174, a FAX control module 175, and an information registration section 176. The system control section 171 controls whole operation of the multifunctional device A. The copy control module 172, the printer control module 173, the scanner control module 174, and the FAX control module 175 perform controls in the copy mode, the printer mode, a scanner mode, and the FAX mode, respectively. The information registration section 176 registers information in the storage section 12 in accordance with a restoration process in the information system. Further, the control section 17 is constituted of a CPU which carries out the process, a ROM which stores a control program, control data, and the like, and a RAM which acts as a memory for the process.

In the information system according to the present embodiment, examples of the restoration process in which setting conditions are read out from a multifunctional device and the read-out setting conditions are stored in a multifunctional device include (i) a cloning process in which setting conditions of a single multifunctional device is imported to other one or more multifunctional devices and (ii) a backup process in which setting conditions of a single multifunctional device is returned to the multifunctional device itself.

Figure 3:
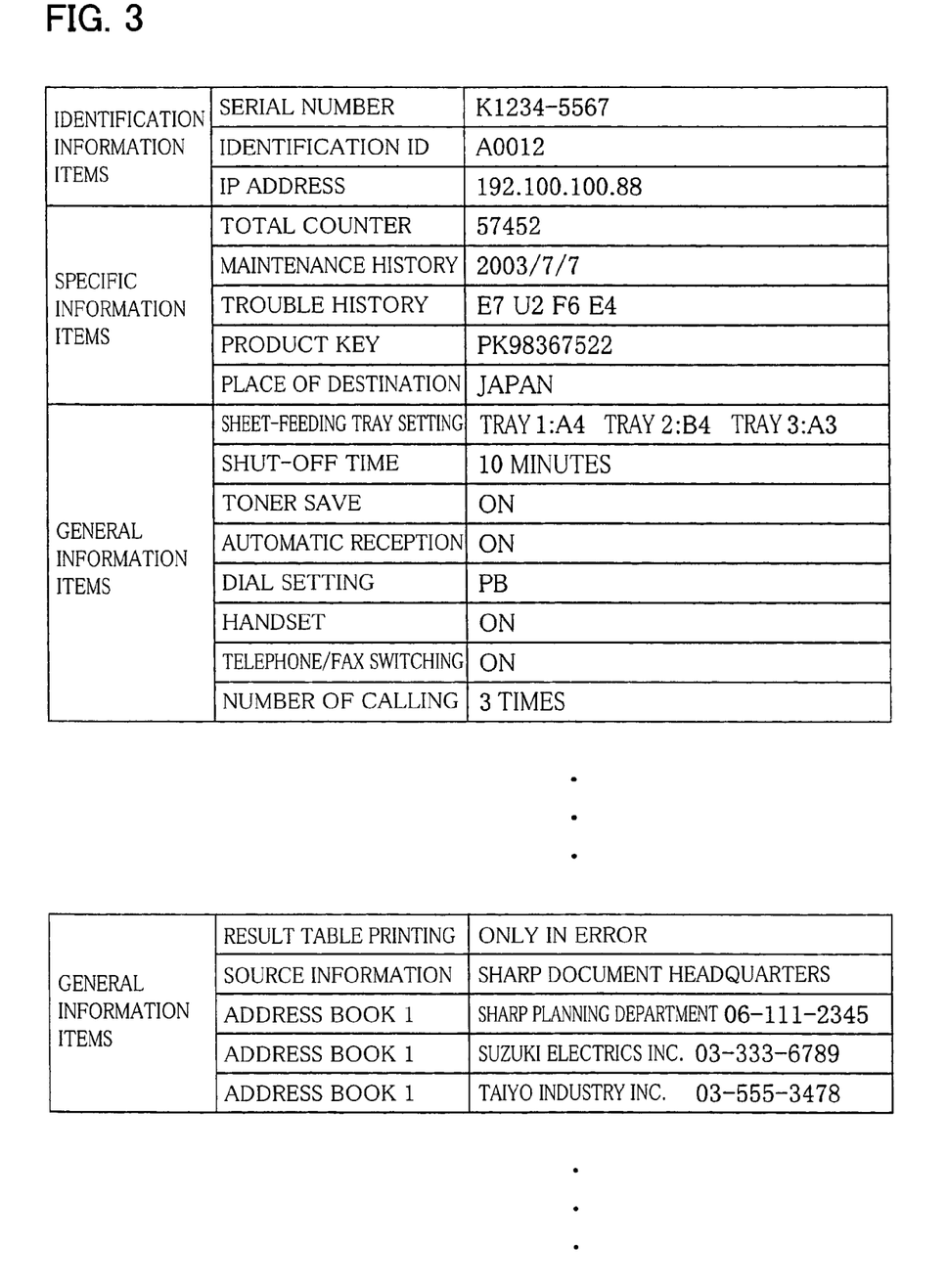
FIG. 3 illustrates an example of a data structure of setting information being an object of the restoration process according to the present invention.

Here, FIG. 3 illustrates an example of a data structure of the setting conditions which are read out in the restoration process. The setting conditions are roughly classified into the identification information items by which each of devices is identified, the specific information items specific to each of the devices, and the general information items shared in common by the devices.

Examples of the identification data items include a serial number, an identification ID, and an IP address. Examples of the specific information items include a total counter, a maintenance history, and a place of destination. Examples of the general information items include sheet-feeding tray setting, a shut-off time, and toner save.

In the restoration process, first, the setting conditions are read out from a multifunctional device and are stored. With reference to a flowchart of FIG. 4, the following explains how to perform this data storage process. In the data storage process, the setting conditions read out from the multifunctional device are stored in the host PC connected with the multifunctional device via the network.

Figure 4:
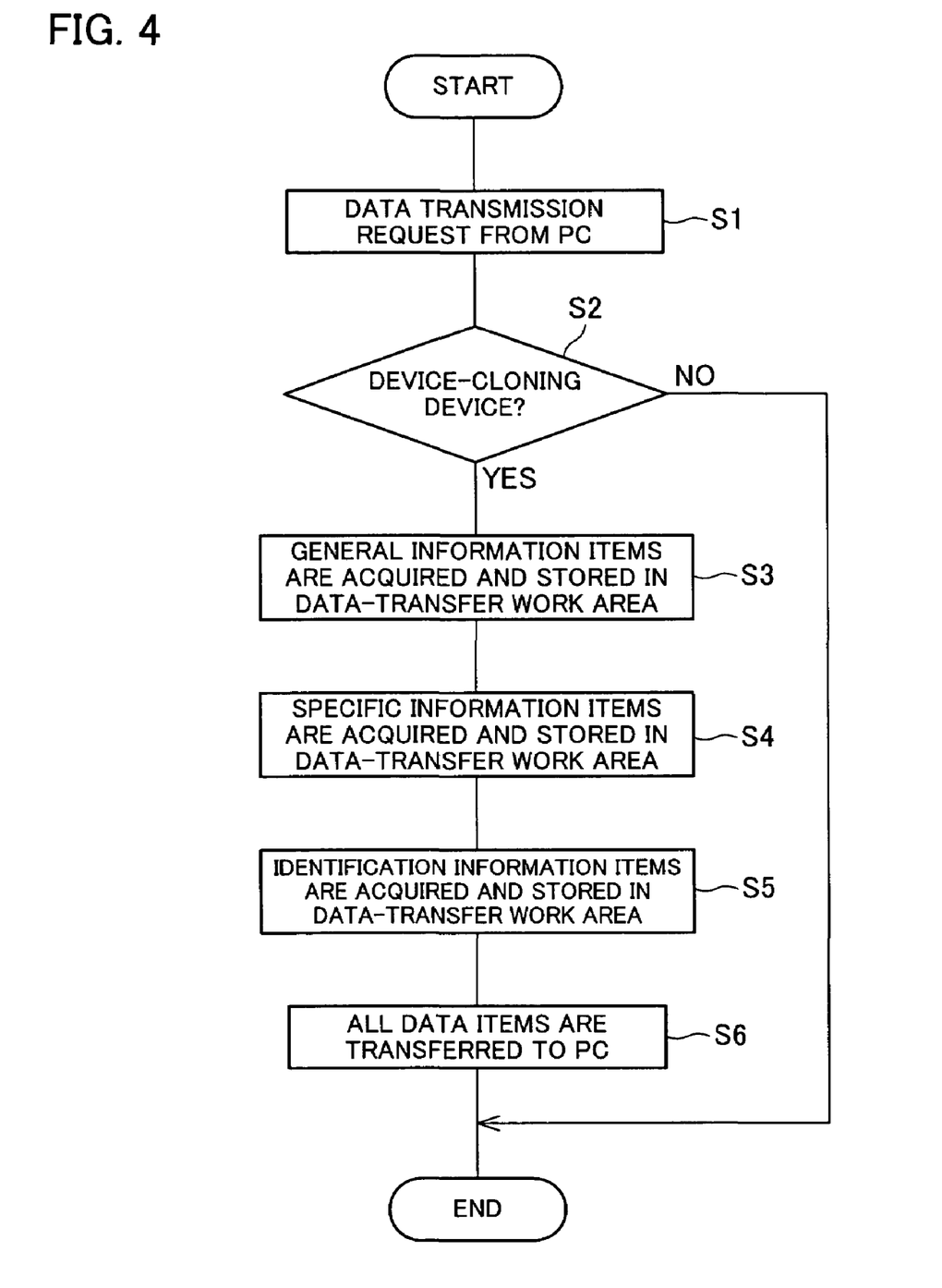
FIG. 4 is a flowchart illustrating how to perform a data storage process in the restoration process according to the present invention.

In the data storage process in the restoration process, first, the host PC transmits a data transmission request to the multifunctional device (S1). When the multifunctional device having received the data transmission request is a device capable of performing the restoration process according to the present invention (referred to as a device-cloning device hereinafter) (YES in S2), the control section 17 of the multifunctional device causes a data-transfer work area to store all of the identification information items, the specific information items, and the general information items stored in the storage section 12 (S3 through S5). Subsequently, the control section 17 transfers all data items stored in the data-transfer work area to the host PC from which the data transmission request has been transmitted (S6). The host PC stores the data items.

When the data storage process is completed, there is performed the data restoration process for resetting setting conditions of one or more multifunctional devices so that the setting conditions are identical with the setting conditions stored in the host PC. With reference to a flowchart of FIG. 1, the following explains how to perform the data restoration process.

Figure 1:
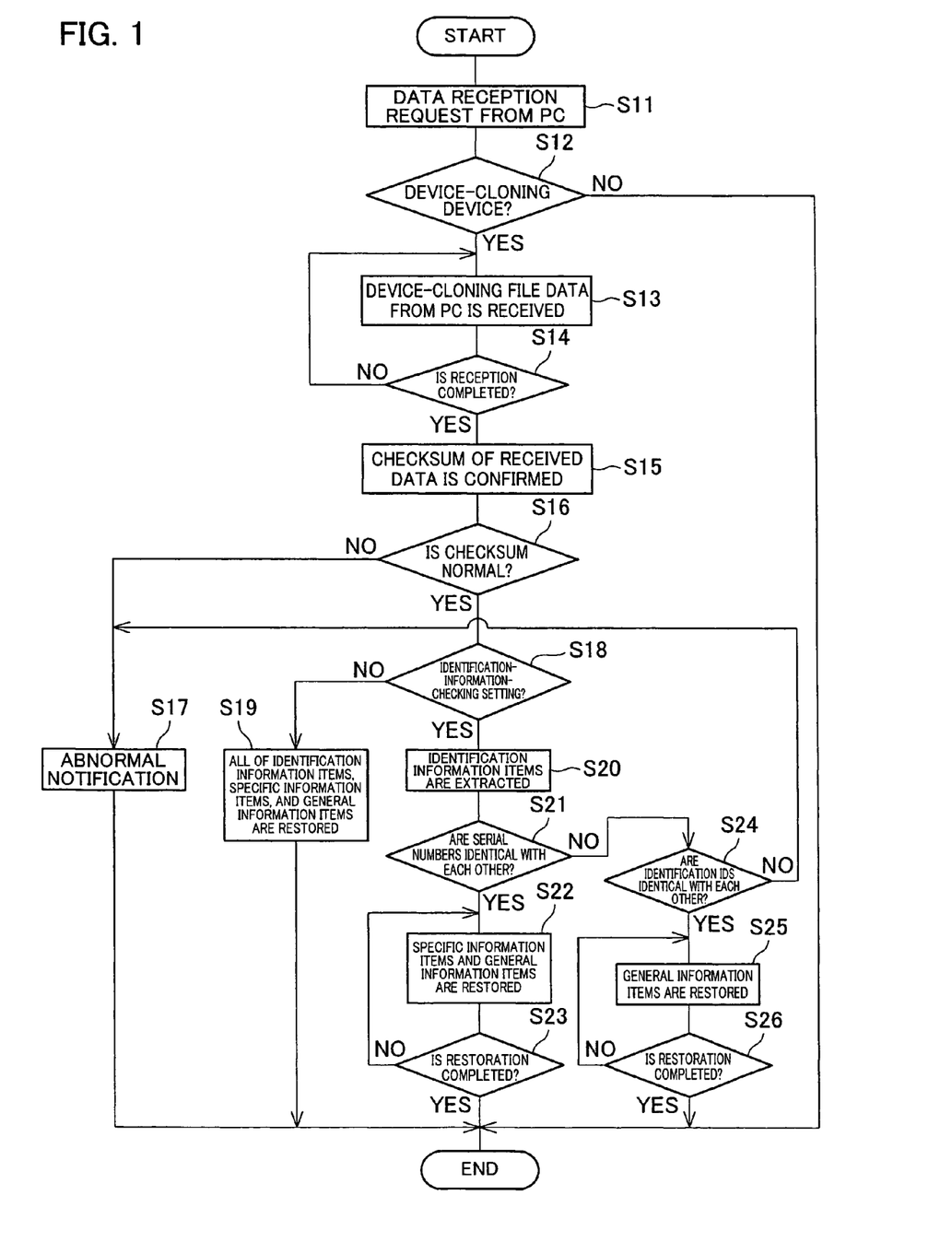
FIG. 1 is a flowchart illustrating how to perform a data restoration process according to an embodiment of the present invention.

In the data restoration process, first, the host PC transmits a data reception request to a multifunctional device in which the data items are to be restored (S11). When the multifunctional device having received the data reception request is a device-cloning device (YES in S12), the multifunctional device receives the data items stored in the host PC (device-cloning file data items, namely, all of the identification information items, the specific information items, and the general information items) from the host PC (S13).

When the multifunctional device has received the device-cloning file data items (YES in S14), checksum confirmation is performed so as to check whether reception is properly performed or not. When abnormality is found in the checksum confirmation (NO in S16), abnormality notification is performed and the process is finished (S17).

On the other hand, when no abnormality is found in the checksum confirmation, the multifunctional device starts a process for setting the device-cloning file data items which the multifunctional device has received from the host PC. In the process, first, it is confirmed whether or not the multifunctional device is in identification-information-checking setting (S18). The identification-information-checking setting is a state in which the multifunctional device is set so as to determine whether the data restoration process is the backup process or the cloning process based on the identification information items and to perform a suitable storing operation in accordance with the process.

When the multifunctional device having received the device-cloning file data items is not in the identification-information-checking setting (NO in S18), the multifunctional device causes the storage section to store all of the received device-cloning file data items (namely, the identification information items, the specific information items, and the general information items) without determining whether the data restoration process is the backup process or the cloning process (S19).

On the other hand, when the multifunctional device having received the device-cloning file data items is in the identification-information-checking setting (YES in S18), the identification information items are extracted from the received device-cloning file data items (S20). When the serial number in the extracted identification information items is identical with the serial number of the multifunctional device having received the device-cloning file data items (YES in S21), it is determined that the data restoration process is the backup process for returning the setting conditions of the multifunctional device to the multifunctional device itself. At that time, the specific information items and the general information items are restored (S22). When the restoration operation is completed, the process is finished (YES in S23).

Further, when the serial number in the extracted identification information items is not identical with the serial number of the multifunctional device having received the device-cloning file data items (NO in S21), it is confirmed whether or not the identification ID of the extracted identification information items is identical with the identification ID of the multifunctional device having received the device-cloning file data items, so as to determine whether or not the data restoration process is the cloning process (S24). When the identification IDs are not identical with each other, it is determined that the device having first read out the setting information items and the device to which the setting information items are to be stored are not devices of the same kind capable of performing cloning process with each other, and accordingly abnormality notification is performed and the process is finished (S17).

When the identification IDs are identical with each other (YES in S24), it is determined that the data restoration process is the cloning process, and only the general information items are restored (S25). When the restoration is completed, the process is finished (YES in S26). Namely, in the cloning process, the specific information items are not restored, and only the general information items are restored.

Figure 5:
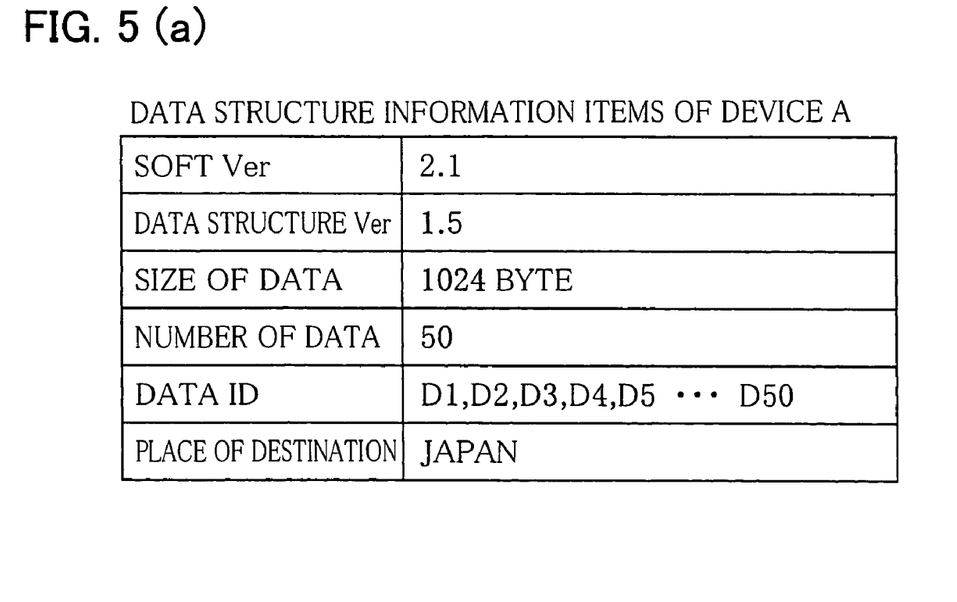

Specifically, the following explains an example of data setting in the cloning process. First, FIGS. 5(a) and 5(b) illustrate examples of data structures. FIG. 5(a) illustrates a data structure in the device A and FIG. 5(b) illustrates a data structure in the device B. Here, the following explains a case of performing a data cloning process in which data items are imported from the device A to the device B.

The process exemplified here is characterized in that: when the received data structure is different from the data structure in the device B, data items are registered with respect to each of data IDs and when the device B has one or more data IDs different from the received data IDs, each of those different data IDs is set to a default value.

Figure 6:
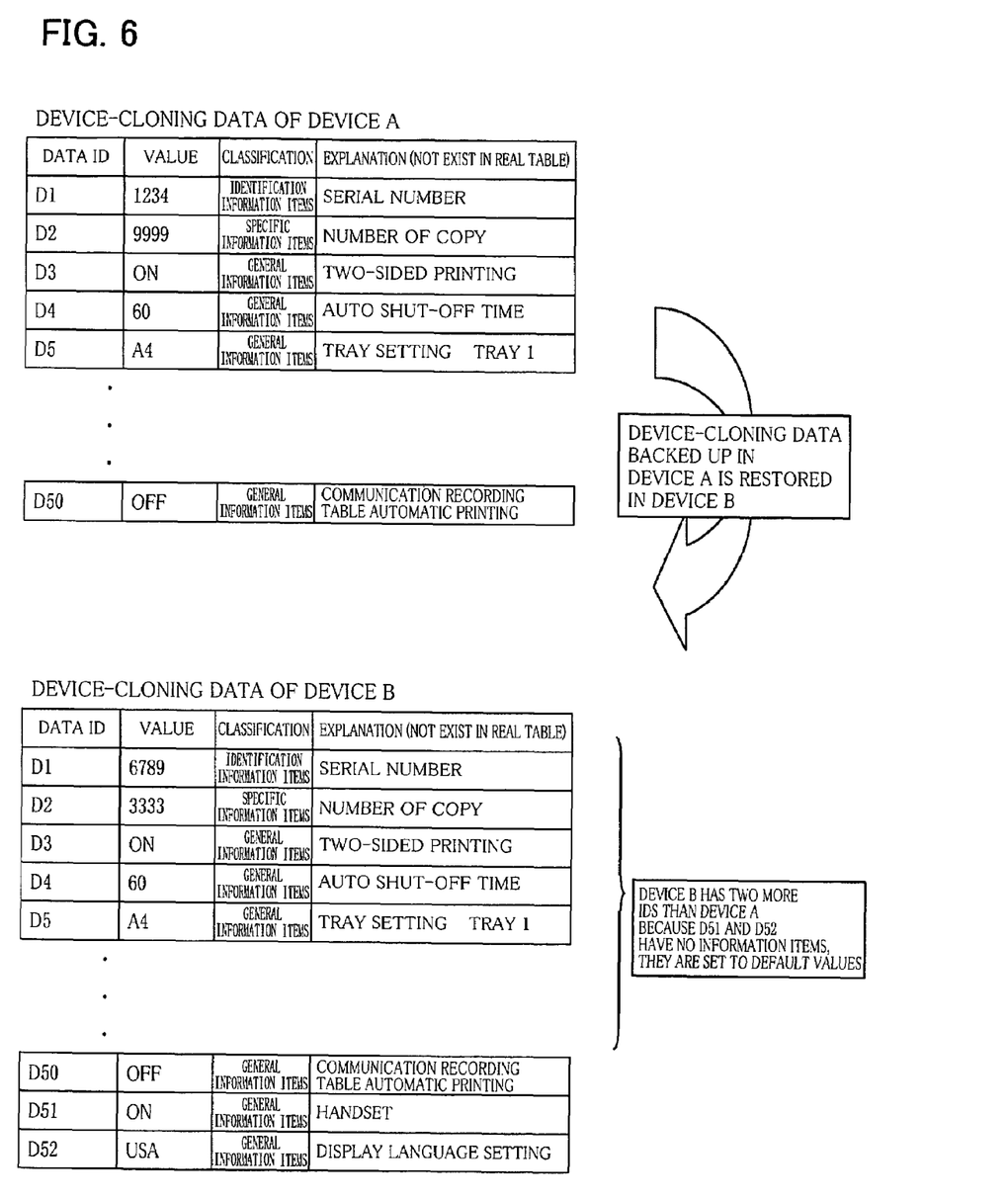
FIG. 6 illustrates an example of the data restoration process in the cloning process.

Namely, when the cloning process is performed so that the setting of the device A is cloned in the device B, the device A has 50 data IDs (D1 through D50) while the device B has 52 data IDs (D1 through D52). Namely, the device B, which is at a reception side in the cloning process, has not only the received data IDs but also two data IDs: D51 and D52. Therefore, in the cloning process at that time, as illustrated in FIG. 6, the device B resets data items concerning data IDs: D1 through D50 so that the data items are identical with the received data items and resets data items concerning the data IDs: D51 and D52 so that the data items are identical with default values.

Such setting is preferable in a case where the device B having been used in other section is newly used in a local section. In that case, it is necessary to reset the device B so that the device B has setting values of the local section. However, in a case where the setting values of the device A in the local section are imported to the device B, when setting parameters of the device B which are not included in the device A are kept having the setting values used in other section, the device B may operate in an unexpected manner. Therefore, the setting parameters of the device B which are not included in the device A are returned to default values (default value: general setting value) having been set at shipment from a factory, so that unexpected operations of the device B are prevented when the device B is newly used in the local section. Further, it is unnecessary to reset the settings of the device B before importing the settings of the device A to the device B.

Figure 7:
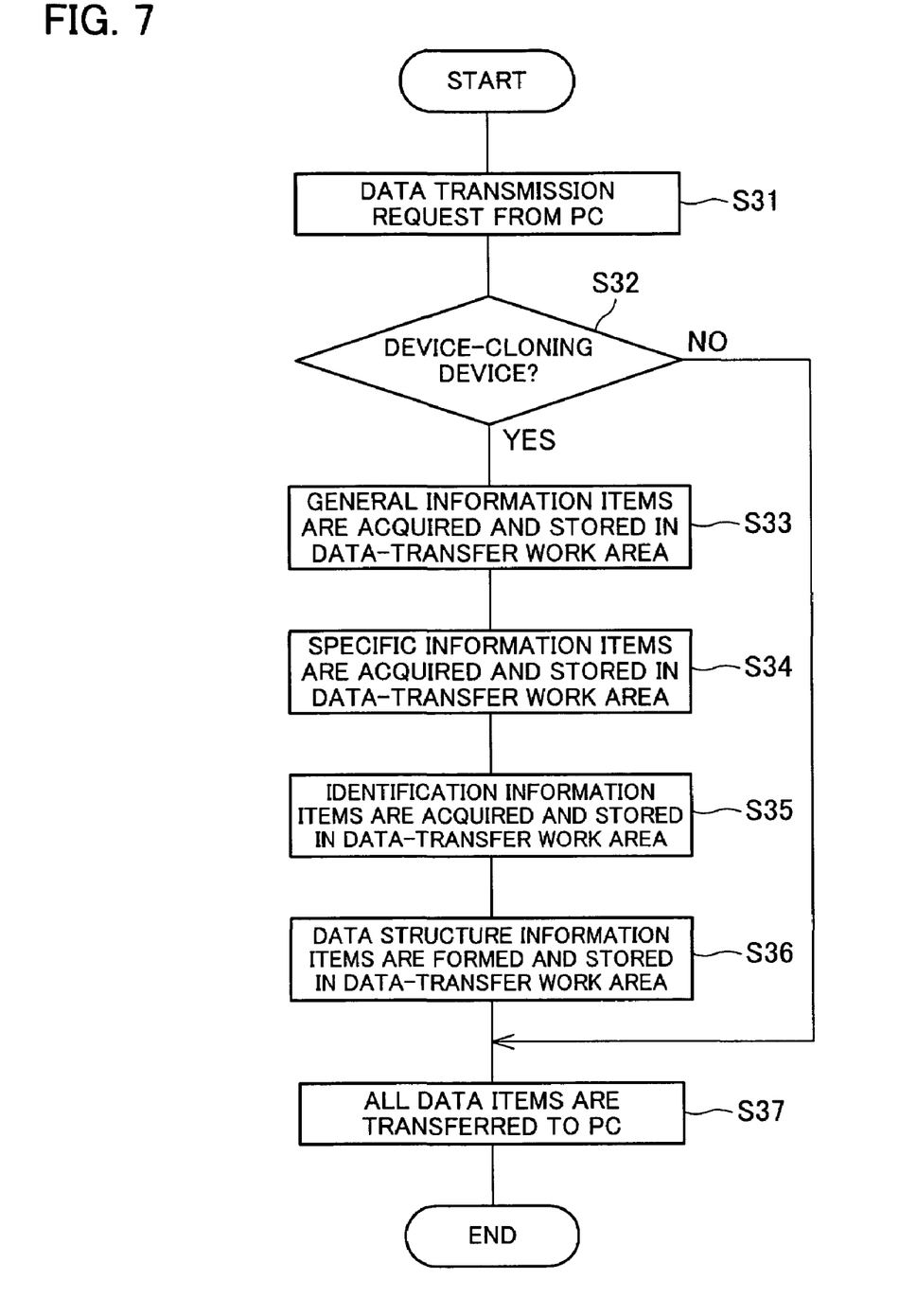
FIG. 7 is a flowchart illustrating how to perform, in a manner different from the manner in FIG. 4, the data storage process in the restoration process according to the present invention.
Figure 8:
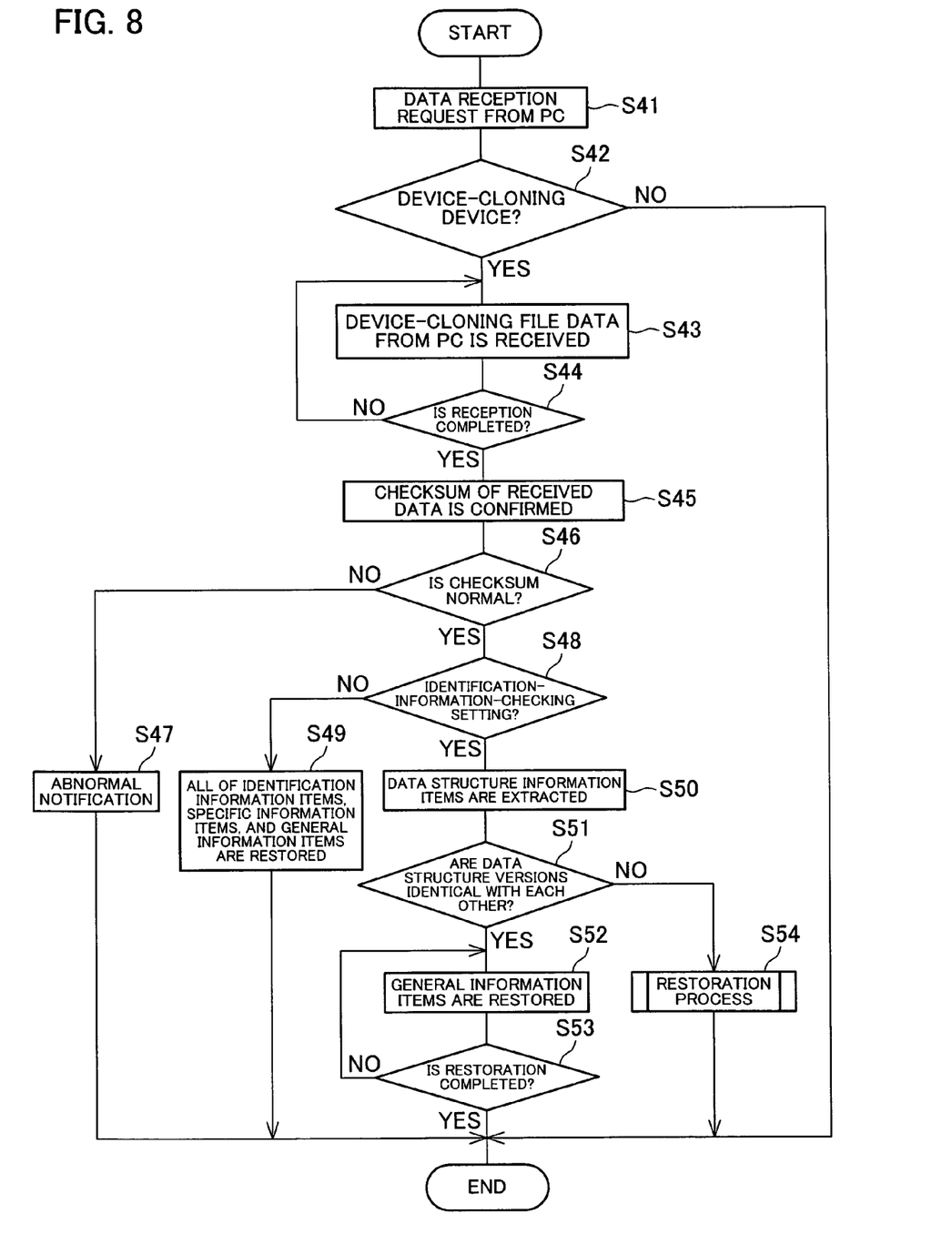
FIG. 8 is a flowchart illustrating how to perform, in a manner different from the manner in FIG. 1, the data restoration process in the restoration process according to the present invention.

With reference to FIGS. 7 and 8, the following explains how to perform the data storage process and the data restoration process in a case of using the data structure as described above.

FIG. 7 is a flowchart illustrating the data storage process. Because S31 through S35 in the process are the same as S1 through S5 in FIG. 4, detailed explanations are omitted here. Further, in the process illustrated in FIG. 7, the data-transfer work area stores not only the identification information items, the specific information items and the general information items but also the data structure information items illustrated in FIG. 5 (S36). Subsequently, all data items stored in the data-transfer work area are transferred to the host PC from which the data transmission request has been transmitted (S37), and the host PC stores the data items.

Next, FIG. 8 illustrates a data restoration process in which the setting conditions stored in the host PC are set in the multifunctional device again. Because S41 through S49 in FIG. 8 are the same as S11 through S19 in FIG. 1, detailed explanations are omitted here.

When the multifunctional device having received the device-cloning file data items is in the identification-information-checking setting in S48 (YES in S48), the data structure information items are extracted from the received device-cloning file data items (S50). Then, it is determined whether or not the extracted data structure information items are identical with the data structure of the multifunctional device having received the device-cloning file data items (S51). Note that the process in S50 is based on the premise that the data restoration process is the cloning process. In a case where the data restoration process may be either the cloning process or the backup process, the present invention should be arranged so that: steps S20 through S24 in FIG. 1 are inserted between steps S48 and S50, and the process goes to S50 in a case of YES in S24.

When the data structures are identical with each other in S51, the number of data items in the device from which the data items are to be imported and the number of data items in the device to which the data items are to be imported are equal to each other. Therefore, the general information items received as the device-cloning file data items are restored together (S52). When the restoration is completed, the process is finished (YES in S53).

Figure 9:
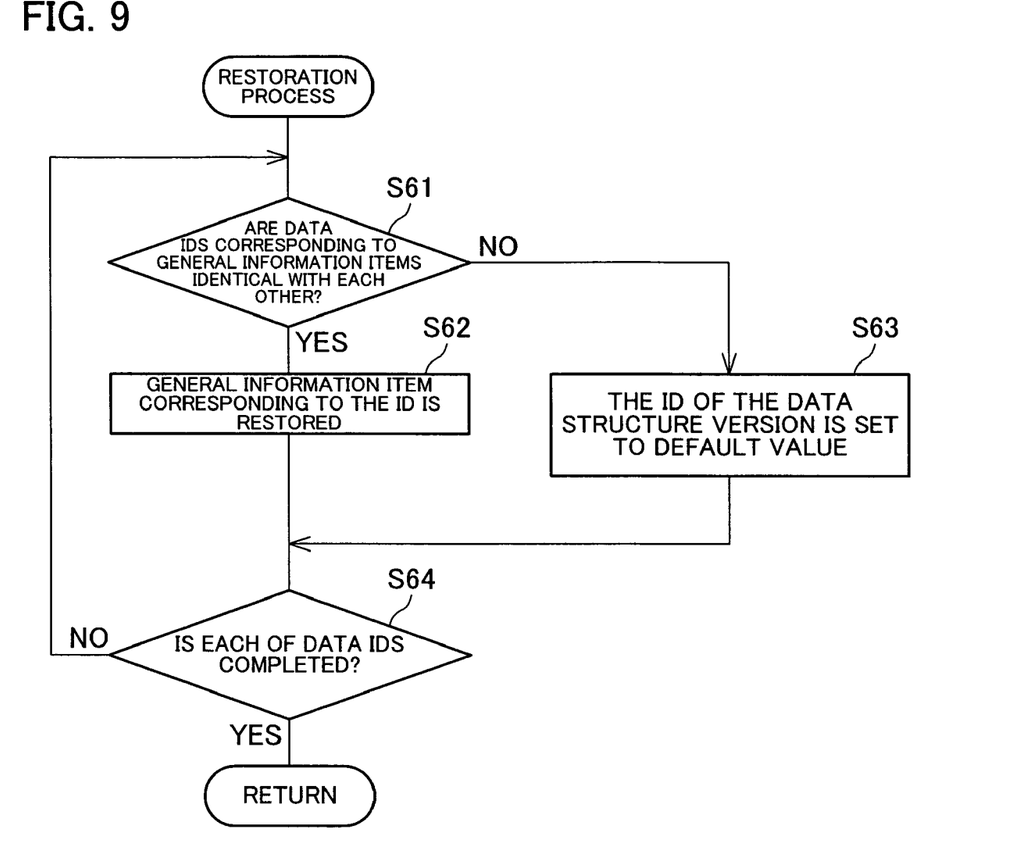
FIG. 9 is a flowchart illustrating an example of how to perform the restoration process in FIG. 8.

On the other hand, when the data structures are not identical with each other in S51, data items are registered with respect to each of the data IDs as described above and a data ID other than the received data IDs in the device to which the data items are to be imported is set to a default value (S54). With reference to FIG. 9, the following explains an example of how to perform the restoration process in S54.

In a flowchart of FIG. 9, it is assumed that the cloning process is performed. Therefore, only the general information items are subjected to the restoration process. At that time, it is determined whether or not the received data IDs include a data ID identical with a data ID corresponding to each of the general information items stored in the device at the reception side (S61).

When there is an identical data ID, the general information item corresponding to the data ID is restored in the device at the reception side (S62). When there is no identical data ID, the general information item corresponding to the data ID is set to a default value (S63). When the restoration process in S62 or S63 is finished, it is confirmed whether an unprocessed data ID exists or not (S64). When the unprocessed data ID does not exist, the process is finished.

Figure 10:
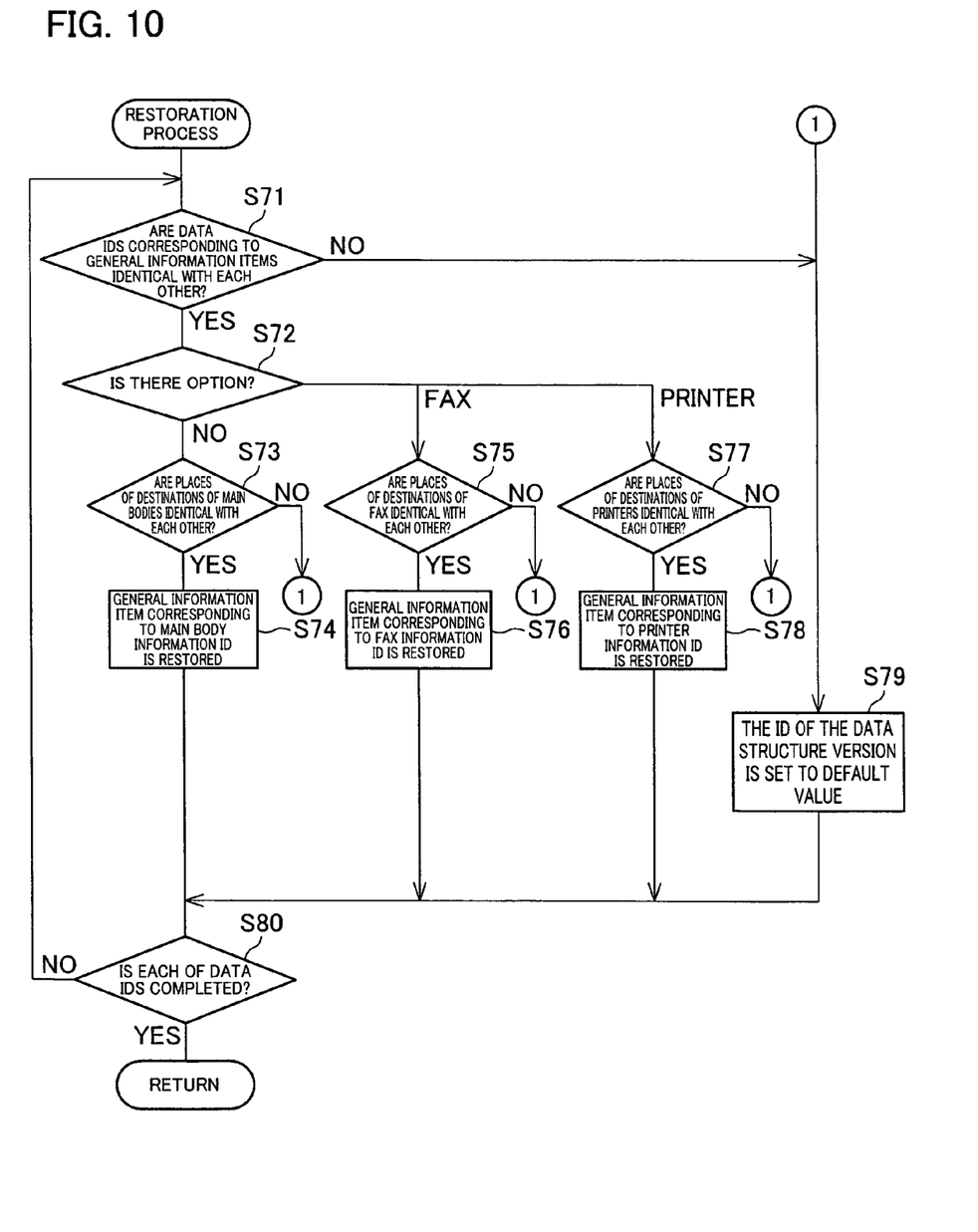
FIG. 10 is a flowchart illustrating an example, different from the example in FIG. 9, of how to perform the restoration process in FIG. 8.

Further, as a modification example of the data restoration process in S54 in FIG. 8, a process illustrated in a flowchart of FIG. 10 is applicable. Namely, the process illustrated in FIG. 10 is performed in a case where information concerning the place of destination (ID of a country or a region where the device is placed) is used.

At that time, as with S61 in FIG. 9, it is confirmed whether or not the received data IDs include a data ID corresponding to each of the general information items stored in the device at the reception side (S71). When there is a corresponding data ID, it is confirmed whether the device at the reception side has an optional function such as the FAX function or the printer function. Note that the optional function is a function whose default value varies according to the place of destination.

In a case where there is no such optional function (NO in S72), it is confirmed whether or not the place of destination of the device at the transmission side is identical with the place of destination of the device at the reception side (S73). When the places of destinations are identical with each other, the general information item corresponding to a main body information ID is restored (S74). In a case where there is the optional function (YES in S72), when the function is the FAX function, it is confirmed whether or not the places of the FAX destinations are identical with each other (S75). When the places of the FAX destinations are identical with each other, the general information item corresponding to a FAX information ID is restored (S76). When the function is the printer function, it is confirmed whether or not the places of the printer destinations are identical with each other (S77). When the places of the printer destinations are identical with each other, the general information item corresponding to a printer information ID is restored (S78).

Further, when the places of destinations are not identical with each other in the steps S73, S75, and S77, the information item concerning the data ID is set to a default value (S79). Further, when the restoration process in S74, S76, S78, or S79 is finished, it is confirmed whether there is an unprocessed data ID or not (S80). When there is no unprocessed data ID, the process is finished.

Note that in S79 of FIG. 10, when the places of destinations are not identical with each other, the information corresponding to the data ID is set to a default value. However, the present invention may be arranged so that: when the places of destinations are not identical with each other, no setting is performed instead of setting the information item to the default value.

Because the parameters which can be set and the default setting values may be different with respect to each place of destination, importation of settings of a different place of destination may cause a trouble in operation of the device. On the other hand, in the process illustrated in FIG. 10, when the device from which data items are to be imported is different from the device to which the data items are to be imported in terms of the place of destination, setting is stopped, thereby preventing occurrence of an unexpected trouble.

Note that the foregoing explains a case where the information communication device according to the present invention is a digital multifunctional device. However, the present invention is not limited to this case. Namely, as long as the device is connected with the information system via the network and various condition settings are possible in the device, substantially the same effect as the present embodiment can be obtained.

Further, the foregoing explains a case where the cloning process of data items from the device A to the device B is performed via the host PC. However, the present invention is not limited to this case. The present invention may be arranged so that the devices A and B directly communicate data items with each other.

Further, the foregoing explains a case where: in the backup process and the cloning process of data items, it is via the network that setting information items are read out of the device from which the information items are to be imported and transmitted to the device to which the information items are to be imported. However, the present invention is not limited to this case. The present invention may be arranged so that: the device from which the data items are to be imported is directly connected with the device to which the data items are to be imported via a multipurpose I/F such as a USB or an RS232C so as to transfer data items, or data items are transferred via a USB memory or a HDD.

The information communication device according to the present invention is an information communication device connectable with an information system via a network, the information communication device including: a storage section for storing (i) identification information items which include a device identifier by which the information communication device is identified, (ii) specific information items specific to the information communication device, and (iii) general information items whose settings are capable of being imported to other one or more information communication devices; a communication section for receiving identification information items, specific information items, and general information items through communication with an outside; a determination section for determining whether or not a device identifier included in the received identification information items is identical with the device identifier stored in the storage section; and an information registration section for (i) resetting the specific information items the and general information items stored in the storage section so that the specific information items and the general information items are respectively identical with the received specific information items and the received general information items when the determination section determines that the device identifiers are identical with each other and (ii) resetting only the general information items stored in the storage section so that the general information items are identical with the received general information items when the determination section determines that the device identifiers are not identical with each other.

Namely, when the device identifiers are identical with each other, it is determined that backup data items are returned from a single information communication device to the information communication device itself (the backup process is performed), with a result that both of the specific information items and the general information items are registered. Further, when the device identifiers are not identical with each other, it is determined that setting conditions are imported from a single information communication device to another information communication device of the same kind (the cloning process is performed), with a result that the general information items shared in common by the devices are registered. As a result, it is possible for the user to set parameters in the device with high operativity without determining, in setting data items to be imported, whether the backup process or the cloning process is performed.

Further, as described above, the information communication device according to the present invention is an information communication device, wherein: the determination section further determines whether or not device classification in the received identification information items is identical with device classification stored in the storage section, and the information registration section resets only the general information items stored in the storage section so that the general information items are identical with the received general information items when the determination section determines that the device identifiers are not identical with each other and that the device classification in the received identification information items is identical with the device classification stored in the storage section.

Further, as described above, the information communication device according to the present invention is an information communication device, wherein: the determination section determines whether or not the received data structure is identical with a data structure of the information communication device and, when the determination section determines that the received data structure is not identical with the data structure of the information communication device, the information registration section registers data items with respect to each of data IDs and, when one or more data IDs other than the received data IDs exist in the information communication device, the information registration section sets each of the one or more data IDs to a default value. With the arrangement, it is possible to prevent such inconvenience that: when a device A having been used in other section is newly used in a local section by importing setting values of the device B in the local section into the device A, setting parameters of the device A which are not included in the device B are kept having values used in other section, and accordingly the device A operates in an unexpected manner.

Further, as described above, the information communication device according to the present invention is an information communication device, wherein: the determination section determines whether or not the received data structure is identical with a data structure of the information communication device, and the information registration section resets the general information items at once so that the general information items are identical with the received general information items when the determination section determines that the received data structure is identical with the data structure of the information communication device. As a result, device information items are registered at once, and accordingly registration is performed speedily.

As described above, the information communication device according to the present invention is an information communication device, wherein: when place-of-destination information exists in the received information items, the determination section further determines whether or not the place-of-destination information in the received information items is identical with place-of-destination information of the information communication device and, when the determination section determines that the received place-of-destination information is not identical with the place-of-destination information of the information communication device, the information registration stops setting the place-of-destination information or sets the place-of-destination information to a default value. Because the parameters which can be set and the default setting values may be different with respect to each place of destination, importation of settings of a different place of destination may cause a trouble in operation of the device. However, even when the places of destinations are not identical with each other, it is possible to prevent an occurrence of unexpected trouble by setting the place-of-destination information to a default value or stopping setting the place-of-destination information.

As described above, the method according to the present invention for setting conditions of an information communication device connectable with an information system via a network is a method including the steps of: reading out, from a information communication device, setting conditions constituted of (i) identification information items which include a device identifier by which the information communication device is identified, (ii) specific information items specific to the information communication device, and (iii) general information items whose settings are capable of being imported to other one or more information communication devices; inputting the read out setting conditions to the information communication device itself or other one or more information communication devices; causing the information communication device, to which the setting conditions are inputted, to determine whether or not a device identifier included in the received identification information items is identical with the device identifier stored in the storage section; and causing the information communication device to which the setting conditions are inputted to reset the specific information items and the general information items thereof so that the specific information items and the general information items are respectively identical with the received specific information items and the received general information items when the device identifiers are identical with each other, and causing the information communication device to which the setting conditions are inputted to reset only the general information items thereof so that the general information items are identical with the received general information items when the device identifiers are not identical with each other.

Namely, when the device identifiers are identical with each other, it is determined that backup data items are returned from a single information communication device to the information communication device itself (the backup process is performed), with a result that both of the specific information items and the general information items are registered. Further, when the device identifiers are not identical with each other, it is determined that setting conditions are imported from a single information communication device to another information communication device of the same kind (the cloning process is performed), with a result that the general information items shared in common by the devices are registered. As a result, it is possible for the user to set parameters in the device with high operativity without determining, in setting data items to be imported, whether the backup process or the cloning process is performed.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

In an information communication device connected with an information system via a network, setting information items read out of a single information communication device are set to the information communication device itself or to other one or more information communication devices. The present invention is applicable to the backup process and the cloning process in a digital multifunctional device connected with the network.

The invention claimed is:

1. An information communication device connectable with an information system via a network,
said information communication device comprising:
a storage section for storing (i) identification information items being specific to the information communication device and allowing the information communication device to be identified, said identification information items including a device identifier by which the information communication device is identified, (ii) specific information items specific to the information communication device, and (iii) general information items whose settings are capable of being imported to other one or more information communication devices;
a communication section for receiving identification information items, specific information items, and general information items through communication with an outside;
a determination section for determining whether or not a device identifier included in the received identification information items is identical with the device identifier stored in the storage section; and
an information registration section for (i) resetting the specific information items and the general information items stored in the storage section so that the specific information items and the general information items are respectively identical with the received specific information items and the received general information items when the determination section determines that the device identifiers are identical with each other and (ii) resetting only the general information items stored in the storage section so that the general information items are identical with the received general information items when the determination section determines that the device identifiers are not identical with each other.

2. The information communication device as set forth in claim 1, wherein
the determination section further determines whether or not device classification in the received identification information items is identical with device classification stored in the storage section, and
the information registration section resets only the general information items stored in the storage section so that the general information items are identical with the received general information items when the determination section determines that the device identifiers are not identical with each other and that the device classification in the received identification information items is identical with the device classification stored in the storage section.

3. The information communication device as set forth in claim 1, wherein
upon receiving the identification information items, the specific information items, and the general information items, the communication section receives data structure information items including (i) the number of data items in the received information items and (ii) data IDs respectively corresponding to the data items,
the determination section determines whether or not the received data structure is identical with a data structure of the information communication device, and
when the determination section determines that the received data structure is not identical with the data structure of the information communication device, the information registration section registers data items with respect to each of data IDs and, when one or more data IDs other than the received data IDs exist in the information communication device, the information registration section sets each of said one or more data IDs to a default value.

4. The information communication device as set forth in claim 1, wherein
upon receiving the identification information items, the specific information items, and the general information items, the communication section receives data structure information items including (i) the number of data items in the received information items and (ii) data IDs respectively corresponding to the data items,
the determination section determines whether or not the received data structure is identical with a data structure of the information communication device, and
the information registration section resets the general information items of the information communication device at once so that the general information items are identical with the received general information items when the determination section determines that the received data structure is identical with the data structure of the information communication device.

5. The information communication device as set forth in claim 1, wherein
when place-of-destination information exists in the received information items, the determination section determines whether or not the place-of-destination information in the received information items is identical with place-of-destination information of the information communication device, and
when the determination section determines that the received place-of-destination information is not identical with the place-of-destination information of the information communication device, the information registration stops setting the place-of-destination information or sets the place-of-destination information to a default value.

6. A method for setting conditions of an information communication device connectable with an information system via a network, said method comprising the steps of:
- reading out, from an information communication device, setting conditions constituted of (i) identification information items which include a device identifier by which the information communication device is identified, (ii) specific information items specific to the information communication device, and (iii) general information items whose settings are capable of being imported to other one or more information communication devices;
- inputting the read out setting conditions to the information communication device itself or said other one or more information communication devices;
- causing the information communication device, to which the setting conditions are inputted, to determine whether or not a device identifier included in the received identification information items is identical with the device identifier stored in the storage section; and
- causing the information communication device to which the setting conditions are inputted to reset the specific information items and the general information items thereof so that the specific information items and the general information items are respectively identical with the received specific information items and the received general information items when the determination section determines that the device identifiers are identical with each other, and causing the information communication device to which the setting conditions are inputted to reset only the general information items thereof so that the general information items are identical with the received general information items when the determination section determines that the device identifiers are not identical with each other.

* * * * *